United States Patent
Cooledge et al.

[11] Patent Number: 5,258,214
[45] Date of Patent: Nov. 2, 1993

[54] PREPRINTED THIN PLASTIC FILM WALL COVERING, AND METHOD FOR MAKING THE SAME

[75] Inventors: Charles R. Cooledge, Rushville; Thomas W. Higgins, Penfield, both of N.Y.

[73] Assignee: Mobil Oil Corporation, Fairfax, Va.

[21] Appl. No.: 431,115

[22] Filed: Nov. 3, 1989

[51] Int. Cl.$^5$ .............................................. B32B 3/06
[52] U.S. Cl. ..................... 428/43; 428/195; 428/409; 428/910; 428/220; 361/225; 264/22; 156/273.1
[58] Field of Search ................ 428/43, 409, 910, 220; 361/225; 264/22; 156/273.1

[56] References Cited
U.S. PATENT DOCUMENTS

| | | | |
|---|---|---|---|
| 848,867 | 4/1907 | Switzer | 40/219 |
| 3,270,101 | 8/1966 | Jardine et al. | 264/22 |
| 4,070,781 | 1/1978 | Sauer | 40/219 |
| 4,225,369 | 9/1980 | Felchlin | 361/225 |
| 4,347,094 | 8/1982 | Watanabe | 156/273.1 |
| 4,521,267 | 6/1985 | Jacobson | 428/43 |
| 4,572,855 | 2/1986 | Kalus et al. | 428/43 |

*Primary Examiner*—Alexander S. Thomas
*Attorney, Agent, or Firm*—Alexander J. McKillop; George W. Hager, Jr.; Michael J. Mlotkowski

[57] ABSTRACT

Thin filmed thermoplastic material wall coverings having a preprinted image thereon and provided with a static electrical charge for securing the coverings to a surface. The wall covering may comprise posters, maps, and the like, and the image is printed on the film by means such as silk-screening. The static electrical charge is sufficient to removably secure the film to a wall surface, a window, or the like, and allows for relocation of the covering without damage to the surface upon which it is secured. The coverings may be packaged individually, or be dispensed from a continuous roll. Preprinted maps adherable to a window surface such as a windshield of an automobile are provided.

15 Claims, 2 Drawing Sheets

PREPRINTED THIN PLASTIC FILM WALL COVERING, AND METHOD FOR MAKING THE SAME

BACKGROUND OF THE INVENTION

1. Field of the Invention

The present invention relates to wall coverings and decorations such as posters, maps, and the like, and more particularly to wall coverings constructed of thin film plastic material which develops and holds a static electrical charge for securing the film to a surface such as a wall or window. The present invention further relates to a method for making such a wall covering.

Wall coverings made from plastic films are well-known in the art, but are generally constructed as part of a display chart or writing pad in which the plastic may be written or drawn on and then removed from the pad for placement on a wall. Wall coverings of this type generally require a thickness of the plastic material sufficient to prevent ripping or tearing due to the pressure of the writing implement. Furthermore, a large static electrical charge is generally necessary to support the weight of this thickened film after it is placed on the wall.

2. Discussion of the Prior Art

In the prior art, wall coverings such as posters and decorative items are well known. Generally, these coverings are secured to a wall surface by pasting, tacking or nailing, or other means which requires inflicting some type of damage to the wall surface. The distinct disadvantage associated with these wall coverings lies in the necessity to repair the wall at the point the covering is applied after the covering has been removed. Relocating the covering, such as a poster, painting, or the like, still requires repair of the wall at the point from which the covering was moved and necessitates damaging the wall at the new location.

To overcome the necessity of tacking or pasting wall covering articles to a wall surface, it has been known to use static electricity for wall articles constructed of a thermoplastic material. In these cases, diagrammatic charts or note pads for use in presentations or meetings are provided so that the user may write directly on the plastic film which is part of a pad supported on an easel or pad holder. After writing or drawing on the thermoplastic film, the film is removed from the pad and may be affixed to the wall through the use of static electricity. However, films of this type suffer the disadvantage that in order for a user to write or draw on the film, the film must be of a sufficient thickness and resiliency to prevent tearing. Furthermore, due to the increased thickness, in order to secure the film to a surface such as a wall, window, or the like, a large static electrical charge must be imparted to the film to support the weight of the film on the surface. In addition, another important disadvantage of a writing pad such as described above lies in the fact that a static charge imparted to the film prior to writing or drawing on the film, such as a charge imparted to the film during manufacture of the pad or drawing board, would be discharged upon frequent and continuous contact with the person writing or drawing on the film.

The use of static electricity to secure thermoplastic films during the molding of thermoplastic articles is disclosed in U.S. Pat. No. 3,270,101 to Jardine, et al. In Jardine, et al., a thermoplastic film having a decorative or descriptive image is positioned within a mold and supported against a wall of mold by static electricity. Molten thermoplastic material is then injected into the mold and solidified within the mold to fuse the thermoplastic film into the thermoplastic material. The finished molded article has the decorative film integrally bonded within the plastic article so that no juncture between the film and the injected material is visible. The thermoplastic film used in Jardine, et al. is generally of small size and is secured to the mold wall, which is comprised of a metal which easily attracts and secures the static charge on the film.

Sauer, U.S. Pat. No. 4,070,781 discloses a window structure having inscription silk-screened thereon. The inscription is constructed of a semi-transparent material which affords good visibility against a light background for seeing through the inscription, and good readability when viewed against a dark background for viewing the inscription itself.

Switzer, U.S. Pat. No. 848,867, discloses decorations for walls, ceilings, and like surfaces which are secured to the surfaces by tacking or pasting. Decorative articles such as those disclosed in Switzer suffer the disadvantage of causing damage in some manner to the surface upon which these are secured.

The novel wall covering of the present invention obviates the problems associated with the prior art wall decorations and coverings by providing a thin film of thermoplastic material having an image printed thereon which may be secured to a wall, window, or the like through the use of a static charge imparted to the plastic material or developed by the film itself, so that the static electricity supports and secures the film to the surface upon which it is desired to attach this covering. The film may be transparent so that when secured to a window, such as a window of an automobile, vision is not obstructed. The film may also be opaque so that light may pass therethrough to enhance the visibility of the image printed thereon. The film is easily attached to the surface, and easily removed for relocation or storage, and avoids damage to the wall surface or window upon which it had been secured.

SUMMARY OF THE INVENTION

The present invention eliminates or substantially ameliorates the disadvantages encounted in the prior art through the provision of an inexpensive, reusable, wall covering formed from a thin film of thermoplastic material having an image preprinted on the film. The film of thermoplastic material develops and holds a static electrical charge, or a charge may be imparted to it, so that the film may be secured to a surface without damaging that surface by tacking, taping, or pasting.

A particular embodiment of the wall covering of the present invention comprises a map printed on the thin thermoplastic film comprising the wall covering, the film and map being of sufficient size to be securable to a window in an automobile, such as the door side window on the driver's side of the automobile, or preferably, on the windshield of the automobile by means of the static charge on the film. The film is of course transparent, and allows the driver or passenger to view the map while having an unobstructed and nondistracted view of the road. Maps of this nature can be assembled in a book form, so that the individual maps are removable from the book for positioning on the window of the car, and may be returned to the book for safekeeping.

A method of making the wall covering of the present invention is also disclosed, and comprises the steps of printing an image on the thin film of thermoplastic material which forms the wall covering, and imparting a charge of static electricity to the film so that the film may be secured to a surface such as a wall, window, or the like. The charge is sufficient to support the weight of the thin film of thermoplastic material to allow the wall covering to remain on the surface upon which it is placed for extended periods of time.

Accordingly, it is primary object of the present invention to provide a wall covering formed of a thin thermoplastic film having a preprinted image thereon, where the film is given a static electrical charge and is capable of holding the charge for extended periods of time.

It is another object of the present invention to provide a wall covering of a thin thermoplastic film material which is transparent and securable to surfaces such as windows.

It is yet another object of the present invention to provide a wall covering such as a map imprinted on a transparent thin film of thermoplastic material which is securable to windows such as automobile windshields.

A still further object of the present invention is to provide a series of wall coverings such as maps which are collected in book form so as to be removable from the book for securement by static electricity to a window such as the windshield of an automobile.

Yet another object of the present invention is to provide an efficient and novel method for constructing a wall covering which is formed from a thin film of thermoplastic material having an image printed thereon and a static electrical charge imparted to it.

BRIEF DESCRIPTION OF THE DRAWINGS

The foregoing objects and other features of the invention will become more readily apparent and may be understood by referring to the following detailed description of an illustrative embodiment of the thin film thermoplastic wall covering, taken in conjunction with the accompanying drawings; in which.

DETAILED DESCRIPTION OF THE PREFERRED EMBODIMENTS

Figure 1:
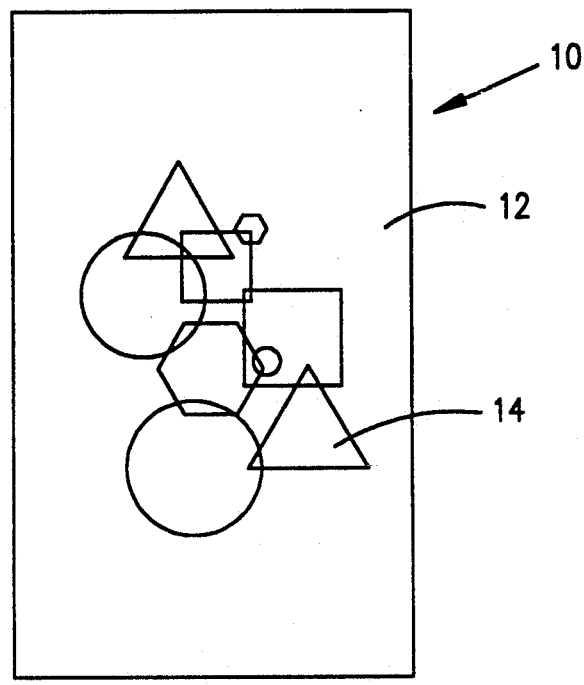
FIG. 1 illustrates a perspective view of a wall covering pursuant to the present invention.
Figure 2:
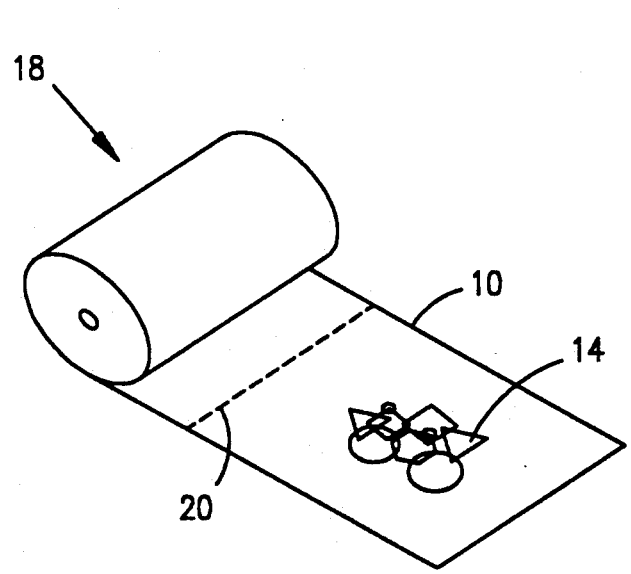
FIG. 2 illustrates a perspective view of a continuous web of a thin film of plastic material dispensed from a role for sequential removal of wall coverings pursuant to the present invention.

Referring now in specific detail to the drawings, in which identical reference numerals identify similar or identical elements throughout the several views, FIG. 1 shows a wall covering 10 consisting of a thin film of thermoplastic material 12, which is preferably transparent or opaque to allow the passage therethrough of light, having an image 14 printed thereon. The film 12 develops and holds a static electrical charge which is accomplished preferably by friction, such as by separating two coverings or by removing a covering 10 from a continuous web of plastic material as shown in FIG. 2. A roll 18 may be provided in which a continuous series of preprinted wall coverings 10 may be dispensed as needed. Perforations 20, extending transverse and parallel to each other may be provided to separate each individual wall covering 10. Friction generated by wall coverings 10 as they are unrolled from roll 18 would generate the static electrical charge for securing the covering to a wall surface.

Figure 3:
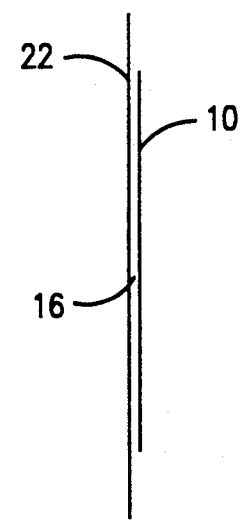
FIG. 3 illustrates a side elevational view, partly in section, of a wall covering pursuant to the present invention which is adhered to a surface such as a wall or window.

As illustrated in FIG. 3, a covering 10 may be secured to a surface such as a wall, window, or the like by means of static electrical charge 16 which causes the film of covering 10 to be attracted to surface 22 and adhere thereto due to charge 16.

Covering 10, constructed of thin film 12, preferably is constructed of a thermoplastic material that is transparent or opaque and which holds a static electrical charge of an extended period of time. An example of such a thermoplastic film is "Oppalyte", which is an oriented polypropylene plastic film. "Oppalyte" is a registered trademark of Mobil Chemical Company. The film is preferably of a thickness between 0.01 mm and 1 mm thick. Thicknesses below 0.01 mm are not preferred since the integrity of the material is compromised and the film tends to rip or tear during handling. Thicknesses greater than 1 mm are also not preferred since the weight of the covering formed by the film will overcome the static charge, thus resulting in the wall covering separating from the wall surface and having poor adhesion properties. The image printed on the film is generally of an ink composition, and is applied to the film by any known manner, such as for example, silk-screening.

Figure 4:
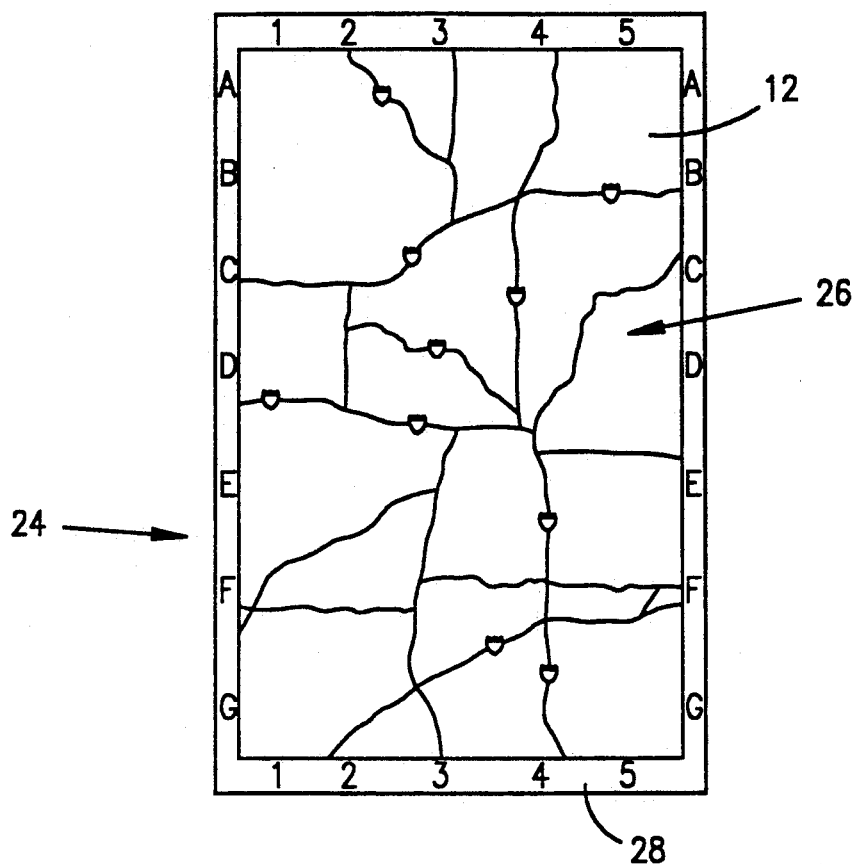
FIG. 4 illustrates a perspective view of a second embodiment of the wall covering pursuant to the present invention showing a map preprinted on the covering.
Figure 5:
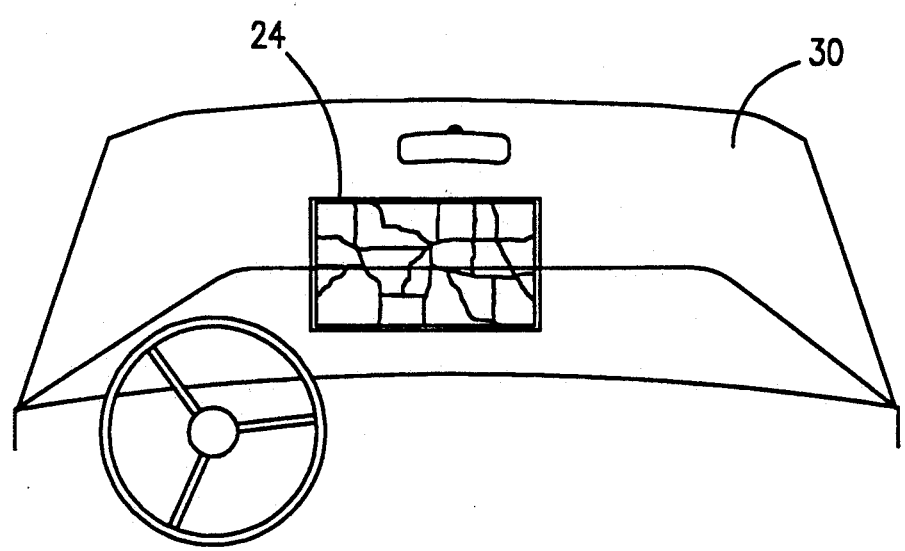
FIG. 5 shows a perspective view of the embodiment of FIG. 4 secured to a windshield of an automobile.

A specific embodiment of the wall covering of the present invention is shown in FIG. 4. The wall covering 24 comprises a transparent film of thermoplastic material 12, preferably of Oppalyte material, which is preprinted with an image such as a map 26. The map is bordered in a conventional manner in grid 28 for reference to various locations on the map. The static electrical charge imparted to the film 12 allows for the adherence of the map to a wall surface or window surface, and preferably the covering 24 may be adhered to a windshield 30 of an automobile as shown in FIG. 5. The novel map according the present invention allows a driver to view the map while affording full vision of the road surface, allowing the driver to concentrate on driving while at the same time determining the direction in which he needs to drive. The hazzard of removing one's eyes from the road while driving alone to read a map is thus eliminated.

The thin film plastic wall covering pursuant to the present invention is of a light-weight, yet durable construction, and due to the static electrical charge imparted to the material allows the covering to adhere to surfaces such as walls and or windows, without tacking, pasting, nailing, or the like. Thus no damage is done to the surface upon which the wall covering is secured, and the covering may be removed and relocated to various positions on the wall without damage to the wall.

While the invention has been particularly shown and described with reference to the preferred embodiments, it will be understood by those skilled in the art that various changes in form and detail may be made therein without departing from the sprit and scope of the invention. Accordingly, modifications and/or changes to the wall covering may be provided as desired, and are considered to be within the scope of the invention.

What is claimed is:

1. A wall covering having a preprinted image thereon, comprising a thin film of oriented plastic material having a thickness between 0.1 mm and 1 mm, said film having a static charge imparted thereto for removably securing said covering to a surface by means of static electricity.

2. A wall covering according to claim 1, wherein said film is transparent.

3. A wall covering according to claim 1, wherein said film is opaque.

4. A wall covering according to claim 1, wherein said film is transparent and is imparted with a static charge sufficient to secure said film to a glass surface such as a window.

5. A wall covering according to claim 1, wherein said film is imparted a static charge sufficient to secure said film to a wall surface.

6. A wall covering according to claim 1, wherein said film is constituted of oriented polypropylene.

7. A wall covering according to claim 1, wherein said film develops and holds a self-generated static electrical charge.

8. A wall covering according to claim 7, wherein said static charge is imparted to said film by static electricity.

9. A thin plastic film, comprising oriented polypropylene in sheet form having a thickness between 0.01 mm and 1 mm, said film having printing thereon and having a static charge imparted thereto for securing said film to a surface by means of static electricity.

10. A wall covering which is separable from a continuous web of oriented thin plastic film having a thickness between 0.1 mm and 1 mm, said film having first and second parallel transverse perforations spaced from each other across said web so as to define a length of said covering; said web of film having a static electrical charge imparted thereto for securing said covering to a surface by means of static electricity.

11. A wall covering according to claim 10, wherein said film is constituted of oriented polypropylene.

12. A wall covering according to claim 10, wherein said film is provided with printing thereon.

13. A transparent thin film of oriented polypropylene plastic having a thickness between 0.1 mm and 1 mm and having the details of a map printed thereon, said film having a static charge imparted thereto sufficient to secure said film to a window of an automobile.

14. A method of making a wall covering constituted of a thin film of oriented polypropylene plastic having a thickness between 0.1 mm and 1 mm, comprising the steps of:

preprinting an image on said film; and imparting a static electrical charge on said film;

such that said charge is sufficiently to secure said covering to a surface such as a wall or a window.

15. A method according to claim 14, wherein said film comprises a continuous web of plastic material which is separable by means of transverse perforations.

* * * * *

US005258214C1

(12) EX PARTE REEXAMINATION CERTIFICATE (5205th)
United States Patent
Cooledge et al.

(10) Number: US 5,258,214 C1
(45) Certificate Issued: Sep. 27, 2005

(54) PREPRINTED THIN PLASTIC FILM WALL COVERING, AND METHOD FOR MAKING THE SAME

(75) Inventors: Charles R. Cooledge, Rushville, NY (US); Thomas W. Higgins, Penfield, NY (US)

(73) Assignee: What a window! Corporation

Reexamination Request:
No. 90/006,261, Apr. 4, 2002

Reexamination Certificate for:
Patent No.: 5,258,214
Issued: Nov. 2, 1993
Appl. No.: 07/431,115
Filed: Nov. 3, 1989

(51) Int. Cl.[7] ............................. G09F 3/00; B32B 3/06
(52) U.S. Cl. ...................... 428/43; 428/195.1; 428/220; 428/409; 428/904.4; 428/910; 361/225; 156/273.1
(58) Field of Search .......................... 428/43, 195, 220, 428/409, 906, 904.4; 361/225; 264/22; 156/273.1; 40/427, 584, 624

(56) References Cited

U.S. PATENT DOCUMENTS

| | | | |
|---|---|---|---|
| 848,867 A | * 4/1907 | Switzer | 40/219 |
| 3,270,101 A | * 8/1966 | Jardine et al. | 264/22 |
| 4,070,781 A | * 1/1978 | Sauer | 40/219 |
| 4,225,369 A | * 9/1980 | Felchlin | 361/225 |
| 4,347,094 A | 8/1982 | Watanabe | 156/273.1 |
| 4,427,731 A | * 1/1984 | Gibson | 428/159 |
| 4,521,267 A | * 6/1985 | Jacobson | 428/43 |
| 4,562,102 A | * 12/1985 | Rabuse et al. | 428/43 |
| 4,572,855 A | * 2/1986 | Kalus et al. | 428/43 |
| 5,010,671 A | 4/1991 | Stonehouse | 40/594 |

* cited by examiner

Primary Examiner—Donald J Loney

(57) ABSTRACT

Thin filmed thermoplastic material wall coverings having a preprinted image thereon and provided with a static electrical charge for securing the coverings to a surface. The wall covering may comprise posters, maps, and the like, and the image is printed on the film by means such as silk-screening. The static electrical charge is sufficient to removably secure the film to a wall surface, a window, or the like, and allows for relocation of the covering without damage to the surface upon which it is secured. The coverings may be packaged individually, or be dispensed from a continuous roll. Preprinted maps adherable to a window surface such as a windshield of an automobile are provided.

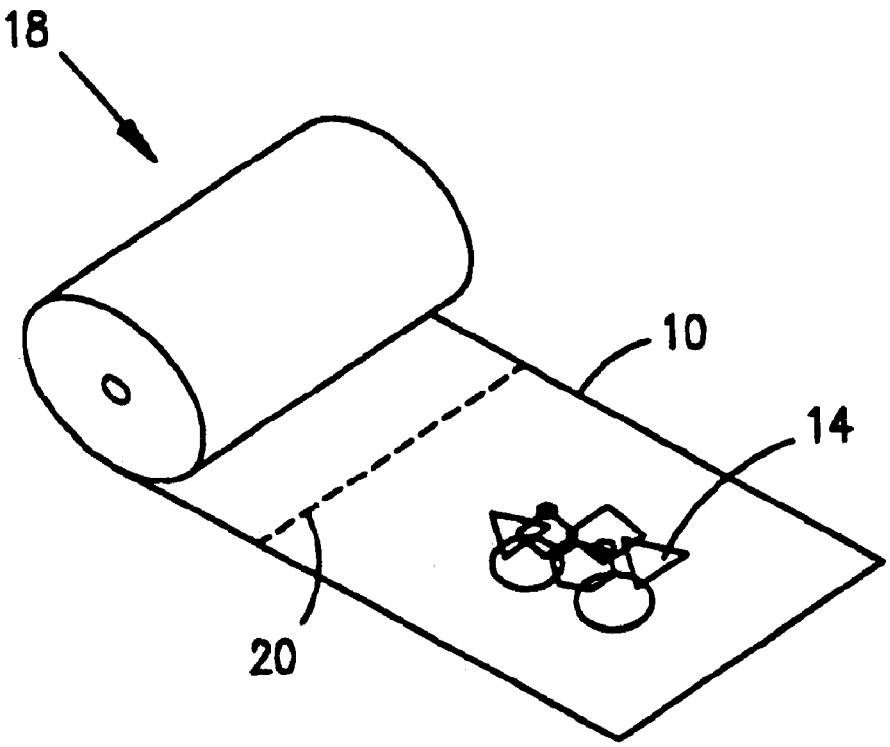

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–15 are cancelled.

* * * * *